US009945353B2

(12) United States Patent
Enevoldsen et al.

(10) Patent No.: US 9,945,353 B2
(45) Date of Patent: Apr. 17, 2018

(54) SPOILER FOR A WIND TURBINE BLADE

(75) Inventors: Peder Bay Enevoldsen, Vejle (DK); Jens Jørgen Østergaard Kristensen, Nibe (DK); Carsten Thrue, Braedstrup (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 896 days.

(21) Appl. No.: 13/448,617

(22) Filed: Apr. 17, 2012

(65) Prior Publication Data
US 2012/0269640 A1 Oct. 25, 2012

(30) Foreign Application Priority Data

Apr. 19, 2011 (EP) .................................. 11162978

(51) Int. Cl.
*F03D 1/06* (2006.01)
(52) U.S. Cl.
CPC .......... *F03D 1/065* (2013.01); *F05B 2230/80* (2013.01); *F05B 2240/122* (2013.01); *F05B 2240/30* (2013.01); *F05B 2250/183* (2013.01); *F05B 2250/611* (2013.01); *Y02E 10/721* (2013.01); *Y02P 70/523* (2015.11)
(58) Field of Classification Search
CPC ...... F03D 1/065; F03D 1/0675; F03D 1/0683; Y02E 10/721; F05B 2240/30; F05B 2230/80; F05B 2240/301; F05B 2240/302
USPC .......... 416/62, 228, 235, 236 R, 236 A, 237; 29/889.1, 889.7, 889.71; 244/213, 214, 244/215, 123.1
See application file for complete search history.

(56) References Cited

U.S. PATENT DOCUMENTS

| | | | | |
|---|---|---|---|---|
| 3,526,032 A | * | 9/1970 | Pipher | 29/509 |
| 5,533,865 A | * | 7/1996 | Dassen et al. | 416/228 |
| 7,413,408 B1 | * | 8/2008 | Tafoya | 416/228 |
| 7,909,576 B1 | | 3/2011 | Starke | |
| 8,277,923 B2 | * | 10/2012 | Christ | 428/139 |
| 2003/0099546 A1 | * | 5/2003 | Stiesdal et al. | 416/228 |
| 2003/0175121 A1 | * | 9/2003 | Shibata et al. | 416/131 |
| 2007/0065290 A1 | * | 3/2007 | Herr | 416/223 R |
| 2009/0274559 A1 | * | 11/2009 | Petsche et al. | 29/889.71 |
| 2010/0329879 A1 | * | 12/2010 | Presz et al. | 416/228 |

(Continued)

FOREIGN PATENT DOCUMENTS

| | | |
|---|---|---|
| CN | 101220799 A | 7/2008 |
| DE | 19964114 A1 | 7/2001 |
| EP | 2031242 A1 | 3/2009 |

(Continued)

*Primary Examiner* — Christopher Verdier

(57) ABSTRACT

A spoiler for a rotor blade includes a base member, which base member has a mounting face for mounting onto a surface of the rotor blade, and an aerodynamic member for detachably connecting onto the base member. Further, a wind turbine includes a number of rotor blades attached to a hub, wherein at least one rotor blade has such a spoiler mounted on a surface strip of the rotor blade. Also, a method of constructing a wind turbine is provided. A rotor blade is manufactured. A base member of the spoiler is mounted onto the rotor blade. The rotor blade is connected to a hub of the wind turbine. An aerodynamic member of the spoiler is attached onto the base member, wherein at least the mounting of the base member onto the rotor blade is performed prior to the connecting of the rotor blade to the hub.

19 Claims, 8 Drawing Sheets

(56) References Cited

U.S. PATENT DOCUMENTS

2011/0142635 A1\* 6/2011 Fritz ............................ 416/62
2011/0142666 A1\* 6/2011 Drobietz et al. ............ 416/228

FOREIGN PATENT DOCUMENTS

| WO | WO 2009/003569 A1 \* | 1/2009 | |
| WO | WO-2010/066501 A1 \* | 6/2010 | ............ F03D 1/06 |
| WO | WO 2011042527 A1 | 4/2011 | |
| WO | WO 2011042528 A1 | 4/2011 | |

\* cited by examiner

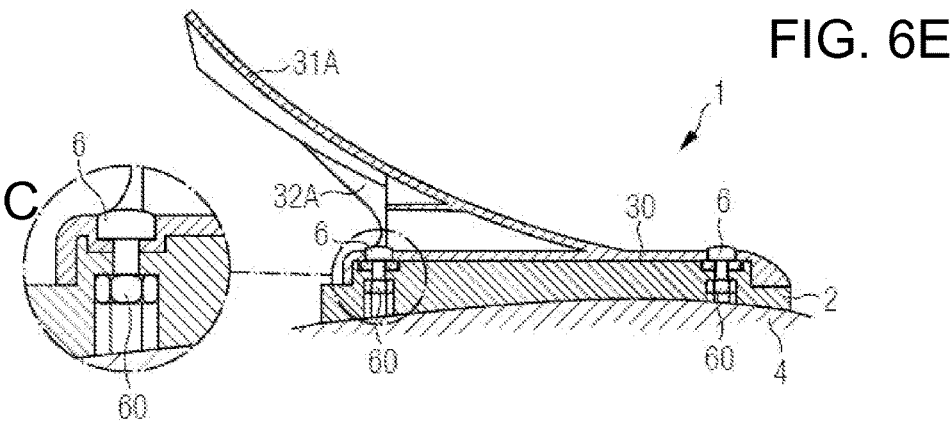
FIG. 6E
FIG. 10C
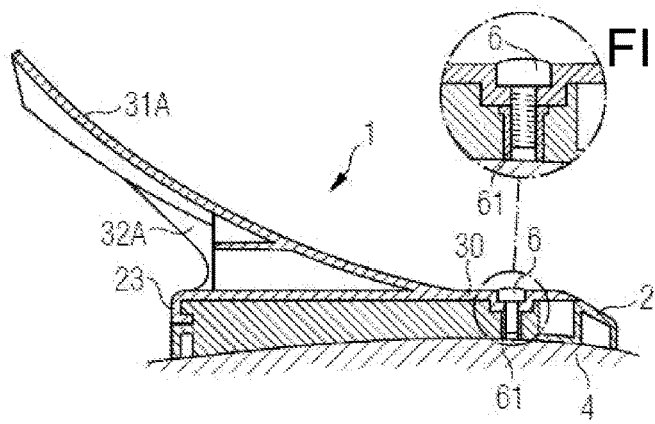
FIG. 6F
FIG. 10D
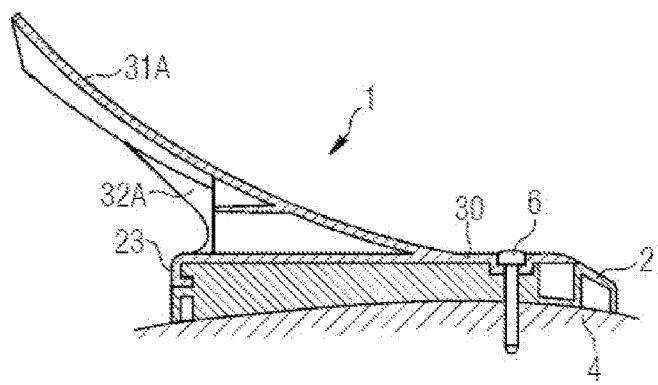
FIG. 6G

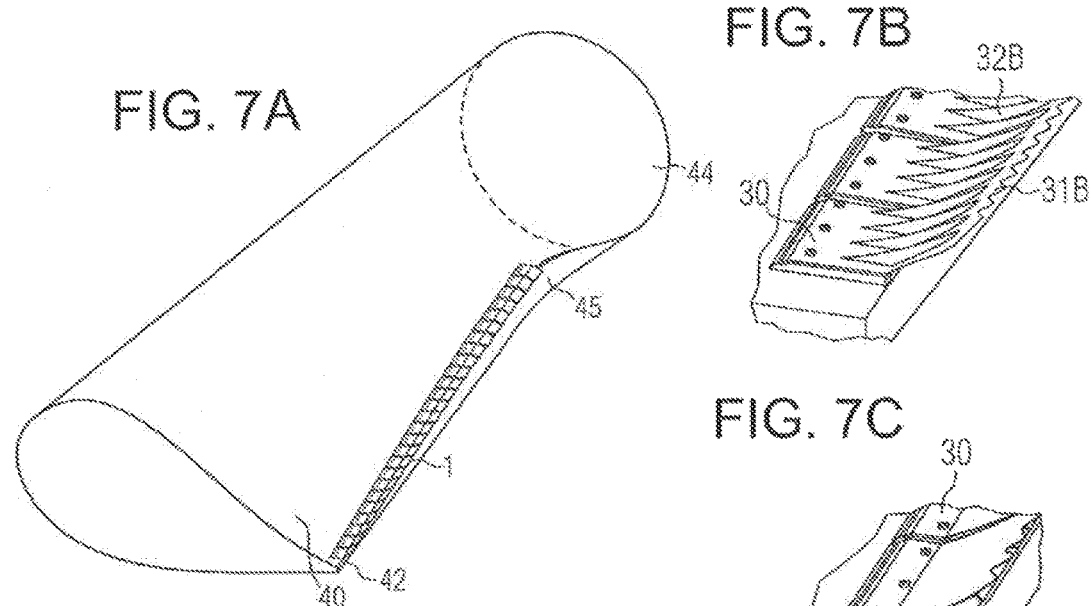
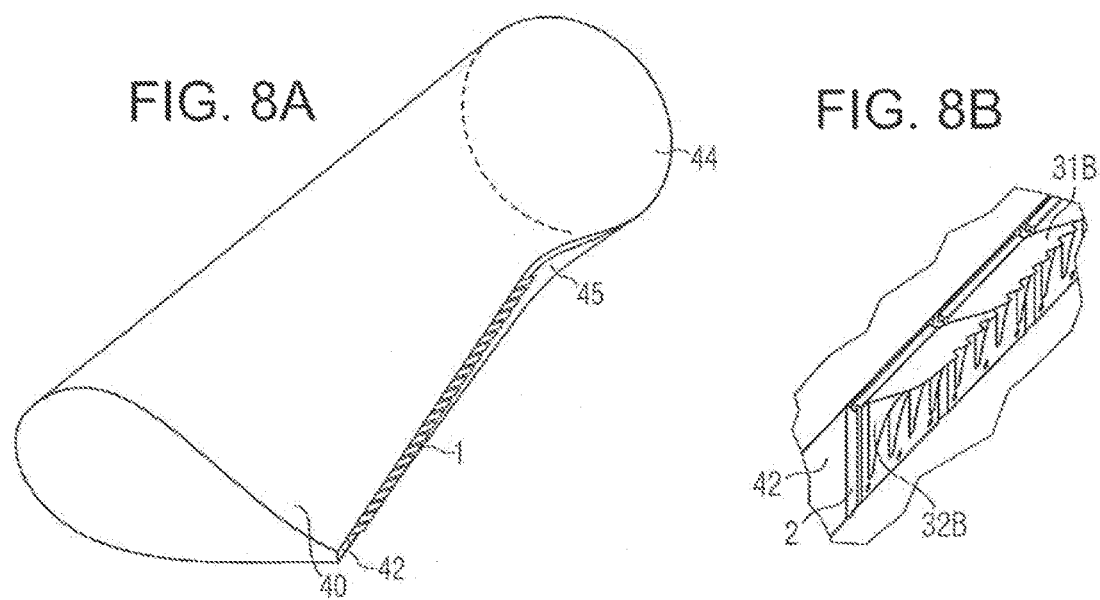

SPOILER FOR A WIND TURBINE BLADE

CROSS REFERENCE TO RELATED APPLICATIONS

This application claims priority of European Patent Office Application No. 11162978.8 EP filed Apr. 19, 2011. All of the applications are incorporated by reference herein in their entirety.

FIELD OF INVENTION

A spoiler for a rotor blade of a wind turbine, a wind turbine, and a method of constructing a wind turbine are provided.

SUMMARY OF INVENTION

The aerodynamic properties of a wind turbine rotor blade may be altered by modifying the profile of the rotor blade. Such aerodynamic alterations could involve some kind of 'extension' to one side of the rotor blade, for example a spoiler extending from a suction side of the blade, i.e. the leeward-facing side of the blade. This can act to reduce the amount of eddies generated as the rotor blade displaces the air through which it moves, and/or to reduce the amount of noise generated by the rotor blade. However, such modifications to the rotor blade during the manufacturing process are not particularly straightforward, since a rotor blade is generally made from fiberglass composite in a vacuum extraction process, which does not lend itself to forming a thin planar extension of a rotor blade surface. Therefore, some approaches have been developed, in which one or more spoilers are mounted onto the rotor blade after this has been formed. However, the addition of such relatively thin and therefore breakable parts makes the transport of the rotor blades, and their mounting onto the hub, more difficult and therefore also more expensive. The established alternative is to attach the spoilers to the rotor blades after these have been mounted to the hub. However, once a rotor blade is in place on the hub, any spoiler modifications or repairs that may become necessary over time are costly and time-consuming, since the spoiler must first be detached from the rotor blade and then a new or replacement spoiler must be mounted.

A spoiler that overcomes the problems mentioned above is disclosed. Further, a wind turbine and a method of constructing a wind turbine with such a spoiler are provided.

A spoiler for a rotor blade of a wind turbine comprises a base member, which base member comprises a mounting face for mounting onto a surface of the rotor blade; and an aerodynamic member for detachably connecting onto the base member.

The wind turbine rotor blade spoiler provides that an aerodynamic member may easily be connected to a base member and just as easily disconnected from the base member, for example to replace it by another aerodynamic member. Also, since the spoiler comprises essentially two separate parts, namely the base member and the aerodynamic member, more flexibility in design is made possible, since various differently shaped aerodynamic members may be attached to one or more 'generic' base members, or vice versa. In this way, the aerodynamic properties of the rotor blade can be modified or fine-tuned at any time, even when the rotor blades are already in place on a hub of the wind turbine.

A wind turbine, with a number of rotor blades attached to a hub, has at least one rotor blade that comprises such a spoiler mounted on a surface strip (band, length, border) of the rotor blade, which surface strip comprises a length along the suction side of the rotor blade and/or a length along the trailing edge of the rotor blade.

Aerodynamic properties of the wind turbine may be modified at any time after construction of the wind turbine, since the replacement, addition or removal of one or more aerodynamic members from the base member(s) is straightforward and uncomplicated.

A method of constructing a wind turbine comprises the steps of manufacturing a rotor blade; mounting a base member of a spoiler onto the rotor blade; connecting the rotor blade to a hub of the wind turbine; and connecting an aerodynamic member of the spoiler onto the base member; wherein at least the step of mounting the base member onto the rotor blade is performed prior to the step of connecting the rotor blade to the hub.

According to the method the base member(s) can be mounted onto the rotor blade in readiness for the aerodynamic member(s), but, since the base member(s) can be relatively flat and also robust, these will not require any special handling or care during the step of mounting the rotor blade to the hub, so that this part of the construction process is not slowed down. Then, once the rotor blades are in place, the step of attaching the aerodynamic members can be carried out easily, as can a later step of adding, replacing or removing an aerodynamic member.

Embodiments and features are given by the dependent claims, as revealed in the following description. Features described in the context of one claim category can apply equally to another claim category. Features of the different claim categories may be combined as appropriate to arrive at further embodiments.

To achieve a favorable reduction in noise or a favorable improvement in the aerodynamic properties of the rotor blade (and therefore also to improve the efficiency of the wind turbine), the spoiler should be mounted onto the rotor blade such that it can effectively reduce drag, reduce eddies in the displaced air mass, etc. Therefore, the mounting face of the base member is disposed toward the suction side of the rotor blade and/or toward a trailing edge surface of the rotor blade, so that the aerodynamic member (which is mounted onto the base member) can be arranged to effectively act as an 'extension' of the suction side and/or trailing edge of the rotor blade.

For an optimal performance, the surfaces of the rotor blade that face into the wind are usually curved in such a way that a minimum of effort is required to cause the rotor blade (and therefore the hub) to turn. This means that at least the surface of the rotor blade on the suction side is not flat, but follows a curved contour. This curved contour need not be continuous, i.e. the curved contour can be curved to various degrees along the surface of the suction side of the blade. Therefore, the mounting face of the base member is shaped to follow the contour of the suction side of the blade, and therefore comprises a concave surface and/or a flat surface and/or a convex surface. For example, the base member can have a mounting face that is essentially concave in a first region (to match a correspondingly convex rotor blade surface region) and/or essentially convex in a second region (to match a correspondingly concave rotor blade surface region) and/or essentially flat in another region (to match a correspondingly flat rotor blade surface region, for example at a transition between neighboring convex and concave rotor blade surface regions). In this way, the base member can favorably accommodate various blade surface shapes.

The base member should be securely fastened to the rotor blade surface. Therefore, the base member comprises at least one through-hole for accommodating a fastener for mounting the base member onto the rotor blade. Such a fastener can be other suitable fastener, for example screws, bolts, rivets, etc for a threaded and/or riveted connection to the rotor blade surface. Preferably, the base member is mounted onto the rotor blade surface so that there are essentially no gaps between the base member and the rotor blade surface. A smooth transition between rotor blade surface and base member should be ensured, so that the aerodynamic properties of the rotor blade are not adversely affected, and so that rainwater cannot collect in a cavity between the rotor blade and the base member. Therefore, an adhesive layer could be used, alternatively or in addition to the other fasteners mentioned above, between the mounting face of the base member and the rotor blade surface for an adhesive connection to the rotor blade.

The aerodynamic member is mounted onto the base member, and also acts as an extension of the rotor blade surface. Therefore, the aerodynamic member comprises a connecting element for connecting to a base member, and an undulating element arranged to project outward from the rotor blade when the aerodynamic member is connected to the base member.

The aerodynamic member should be securely connected to the base member, while also being detachable from the base member, so that the aerodynamic member can be removed or replaced at some later date. Therefore, the spoiler comprises a snap-fit connector and/or a tongue-and-groove connector between a base member and an aerodynamic member. Of course, other types of connecting means could be used, in addition or as an alternative. For example a type of Velcro® fastener could be used, as long as the connecting means ensures a close and secure fit between the aerodynamic member and the base member.

The 'undulating element' can be a planar element formed to have a 'wavy' profile. Alternatively, or in addition, the undulating element can have a wavy contour. Of course, the undulating element could essentially comprise a planar strip that assumes an undulating or wavy shape when the rotor blade is put into motion by the wind.

The aerodynamic member is preferably formed so that it reduces eddies in the displaced air masses, for example by ensuring a smoother flow of air. This can be achieved by a relatively thin undulating element. However, to ensure that the undulating element itself is not unduly bent or deformed by the wind, the aerodynamic member preferably comprises a reinforcing element, which reinforcing element is arranged between the connecting surface and the undulating element.

As mentioned above, the surface contour of the undulating element might be distorted when the rotor blade is put into motion by the wind. However, the aerodynamic member comprises a rigid undulating element, so that a 'wavy' shape of the aerodynamic element is intentionally achieved by design, and this shape is also maintained during rotation of the rotor blade.

Instead of using a relatively thin undulating element supported by a reinforcing element, the aerodynamic member could comprise a closed spoiler body. The closed spoiler body could be hollow or solid, depending on the choice of material from which the spoiler is made. The parts of the spoiler can be manufactured using one or more techniques of the group of techniques comprising extrusion, casting, and injection molding. For example, the base member can be made of a relatively heavy and hard material in an injection molding process, while the aerodynamic member can be made of a lighter material in an extrusion process. Furthermore, the undulating element and any reinforcing elements of an aerodynamic member could be made separately and then joined in some suitable manner, or the aerodynamic member could be manufactured in one piece.

The spoiler may comprise a single base member to which a corresponding single aerodynamic member is connected. However, for more flexibility, for example to allow the replacement or removal of one or more specific aerodynamic member(s), the spoiler may comprise a plurality of base members and/or a plurality of aerodynamic members. For example, several base members could be used to prepare a non-uniform, narrow stretch or strip along an edge of the suction side of the blade. The base members could have differently shaped mounting faces to suit the surface of the rotor blade, and/or the base members could be mounted at different angles or orientations in order to obtain a curved spoiler path along the curved edge of the rotor blade. Alternatively, a base member can have a flexible mounting face that can adapt to slight contour variations of the rotor blade surface, while still allowing a robust connection to an aerodynamic member.

Similarly, several aerodynamic members could be used in the spoiler. For example, a separate aerodynamic member could be connected to each of a plurality of base members. Equally, an aerodynamic member might span two or more base members, or two or more aerodynamic members might be mounted on a single base member. Any such combination is possible. Furthermore, base members might be mounted onto the suction side of the rotor blade and/or on the trailing edge of the rotor blade, so that aerodynamic members can correspondingly be arranged on the suction side and/or on the trailing edge of the rotor blade.

As indicated above, the spoiler may be arranged to follow a 'spoiler path' along a narrow strip or band of the rotor blade surface. Preferably, such a band or surface strip commences in the region of a shoulder of the rotor blade and extends in the direction of the blade tip.

The spoiler allows a simple and straightforward correction or alteration of the aerodynamic properties of the rotor blade and therefore also of the wind turbine. The method therefore comprises the steps of disconnecting an aerodynamic member from a base member of a spoiler mounted on a rotor blade, which rotor blade is connected to the hub of the wind turbine; and connecting a replacement aerodynamic member onto the base member to alter the aerodynamic properties. For example, it may be necessary at some point to replace a damaged aerodynamic member, to adjust the level of noise generated by the wind turbine by using a different type of aerodynamic member, to attach one or more additional aerodynamic members onto 'placeholder' base members, or to remove one or more aerodynamic members from the rotor blade. In each case, the modification is easy to carry out, since a service technician can relatively easily access the spoiler, for example he could descend on a rope from an access opening in the hub to reach the spoiler of a downward-pointing rotor blade. The aerodynamic members can be relatively small, so that the service technician does not have to carry large parts. Furthermore, since the aerodynamic members can be connected to the base members simply using tongue-and-groove or snap-connectors, the service technician need not carry heavy tools or equipment for the maintenance step.

Other objects and features will become apparent from the following detailed descriptions considered in conjunction with the accompanying drawings. It is to be understood, however, that the drawings are designed solely for the purposes of illustration.

BRIEF DESCRIPTION OF THE DRAWINGS

FIG. 6E shows a cross-sectional view of a spoiler according to a further embodiment;
FIG. 6F shows a cross-sectional view of a spoiler according to a further embodiment;
FIG. 6G shows a cross-sectional view of a spoiler according to a further embodiment;
FIG. 7A shows a spoiler according to an embodiment mounted onto the suction side of a rotor blade of a wind turbine;
FIG. 7B shows an enlarged view of a portion of the spoiler of FIG. 7A;
FIG. 7C shows an second enlarged view of a portion of the spoiler of FIG. 7A;
FIG. 8A shows a spoiler according to a further embodiment mounted onto the trailing edge of a rotor blade of a wind turbine;
FIG. 8B show an enlarged view of a portion of the spoiler of FIG. 8A;
FIG. 10C shows an enlarged cross-sectional view of a portion of the spoiler of FIG. 6E;
and
FIG. 10D shows an enlarged cross-sectional view of a portion of the spoiler of FIG. 6F.

DETAILED DESCRIPTION OF INVENTION

Figure 1:
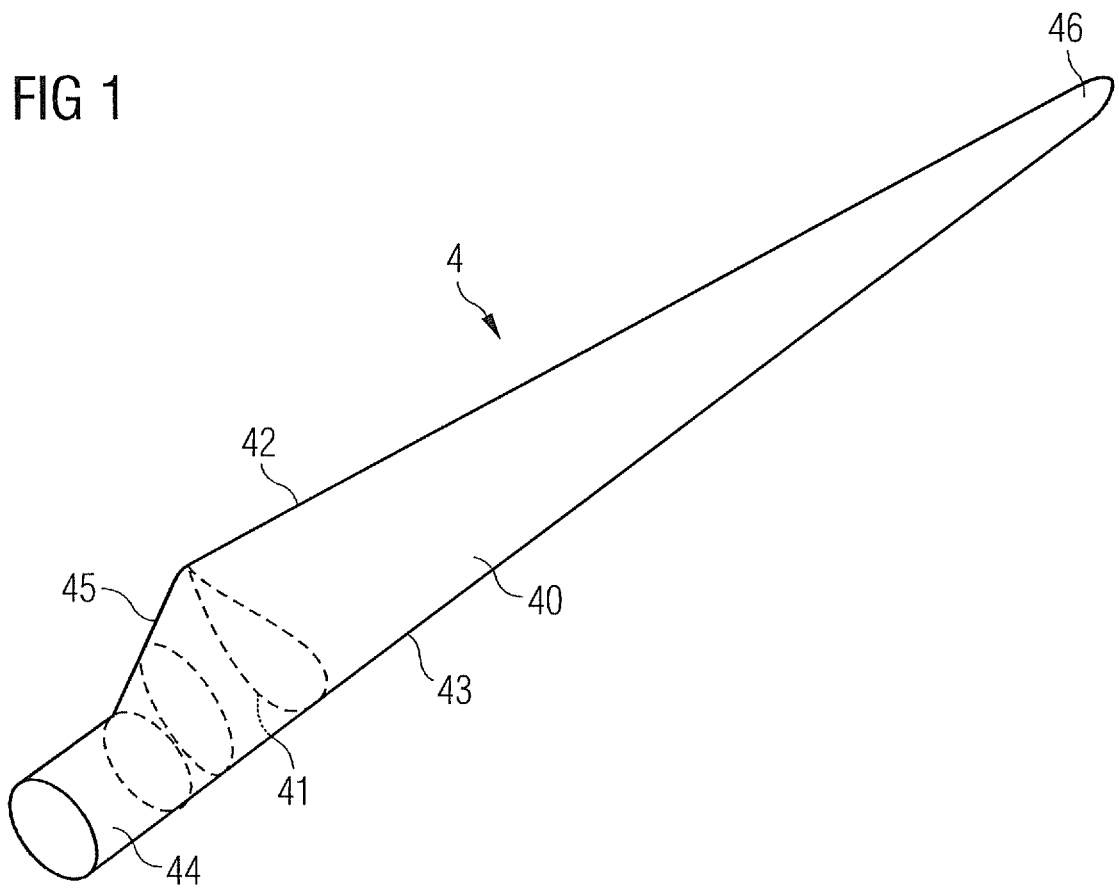
FIG. 1 shows a rotor blade for a wind turbine.

In the drawings, like reference numbers refer to like objects throughout. Objects in the diagrams are not necessarily drawn to scale.

FIG. 1 shows a rotor blade 4 for a wind turbine. The rotor blade 4 comprises a root end 44, which is usually circular in cross-section and is attached to a corresponding bearing in a hub of the wind turbine. In a transition from the root 44 to a shoulder region 45, the blade becomes wider and flatter, and thereafter becomes progressively narrower and thinner towards a tip 46. The blade 4 is shaped to have a cross-section similar to that of an airfoil, so that the wind can displace the rotor blade 4, which in turn causes the hub (and therefore a rotor of an electrical generator) to rotate. To this end, the blade 4 has a 'suction side' 40 with an essentially convex surface that faces into the leeward side as the blade 4 turns, and a 'pressure side' with an essentially concave surface that faces into the windward side as the blade 4 is caused to turn. Eddies or disturbances arising as the air is displaced can result in additional unwanted drag, as well as unfavorable levels of noise. As the blade 4 turns, one long edge 43 (the leading edge 43) leads, while the other long edge 42 'trails behind', and this is therefore referred to as the trailing edge.

Figure 2A:
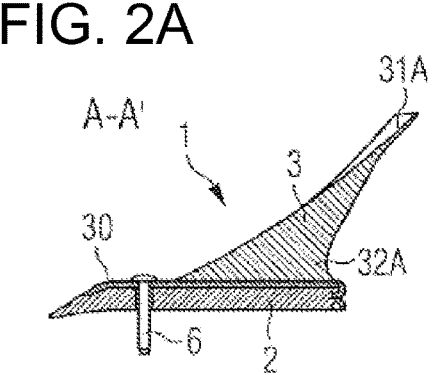
FIG. 2A shows a cross-section of a wind turbine rotor blade spoiler according to an embodiment.
Figure 2B:
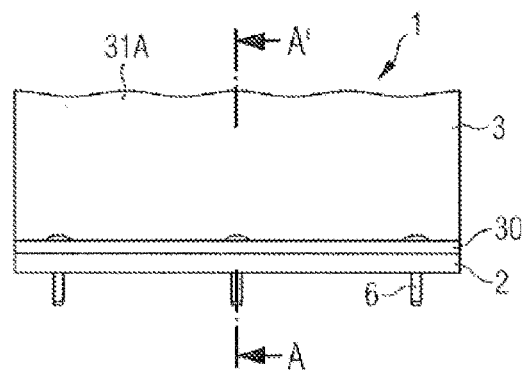
FIG. 2B shows a front view of a wind turbine rotor blade spoiler according to an embodiment.

FIG. 2 shows a cross-section A-A' and a front view of a wind turbine rotor blade spoiler 1 according to an embodiment. The diagram shows a base member 2, which can be fastened to a rotor blade using a fastener 6, and an aerodynamic member 3, which is connected to the base member 2 in a detachable manner by means of a connecting element 30. From the side (as seen on the left), the aerodynamic member 3 comprises an undulating element 31A with a wavy planar surface, supported by a reinforcing element 32A. On the right, a front view of the spoiler 1 shows the wavy nature of the undulating element 31A, and a number of fasteners 6 inserted through the connecting element 30 and the base member 2.

Figure 3:
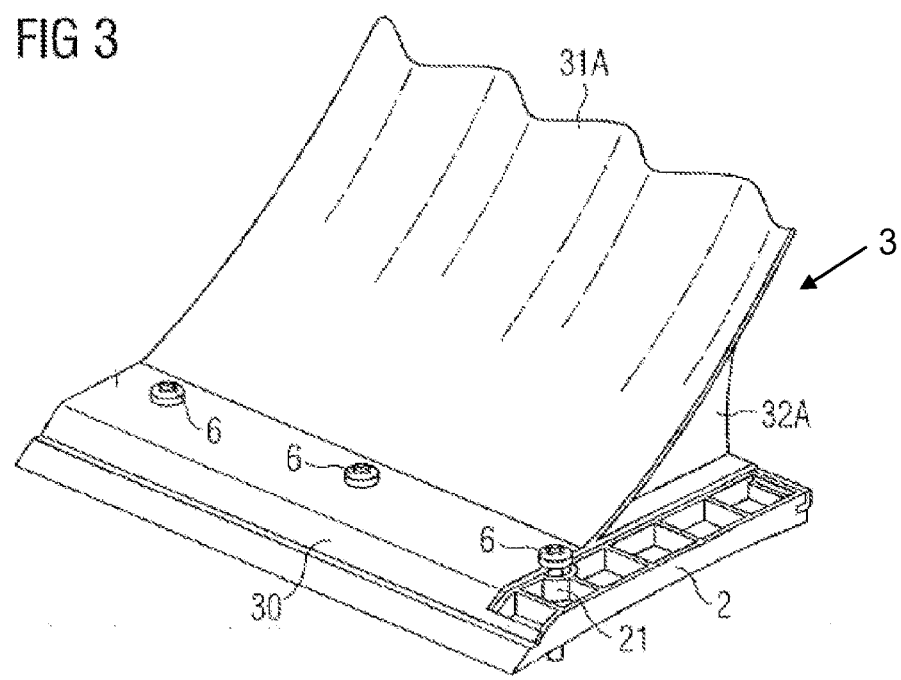
FIG. 3 shows a perspective view of the spoiler of FIG. 2.

FIG. 3 shows a perspective view of the spoiler 1 of FIG. 2. The partial cut-away of the connecting element 30 shows a possible realization of the base member 2, in this case a mesh or grid structure which is both light and structurally robust. Through-holes 21 for accommodating fasteners 6 can be formed at appropriate intervals at intersections of the grid structure.

Figure 4:
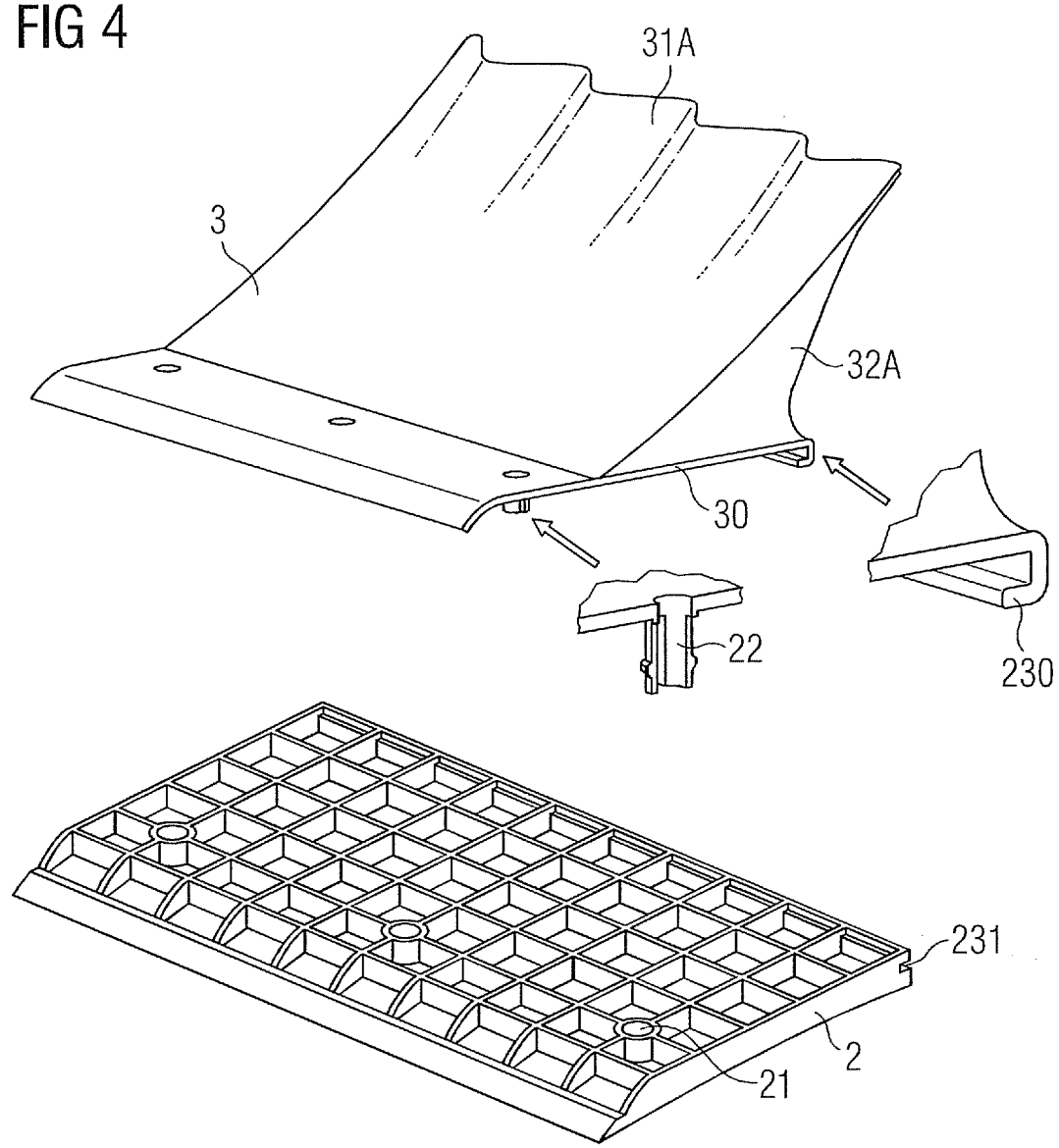
FIG. 4 shows an exploded view of the spoiler of FIGS. 2 and 3.

FIG. 4 shows an exploded view of the spoiler 1 of FIGS. 2 and 3. Here, the grid structure of the base member 2 is clearly visible. The diagram also shows a possible realization of a snap-fit bushing 22 of the connecting element 30. This can snap onto a lower edge of the through-hole 21, so that the aerodynamic member 3 is firmly connected at that point to the base member 2. A tongue 230 along a longitudinal edge of the connecting element 30 and a corresponding groove 231 along an edge of the base member 2 can connect in a tongue-and-groove connection along the outer edge of the spoiler 1.

Figure 5A:
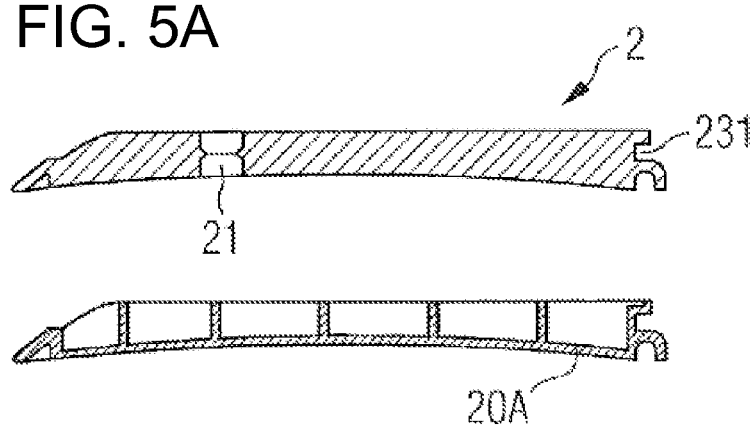
FIG. 5A shows cross-sectional view of base member for a spoiler according to an embodiment.
Figure 5B:
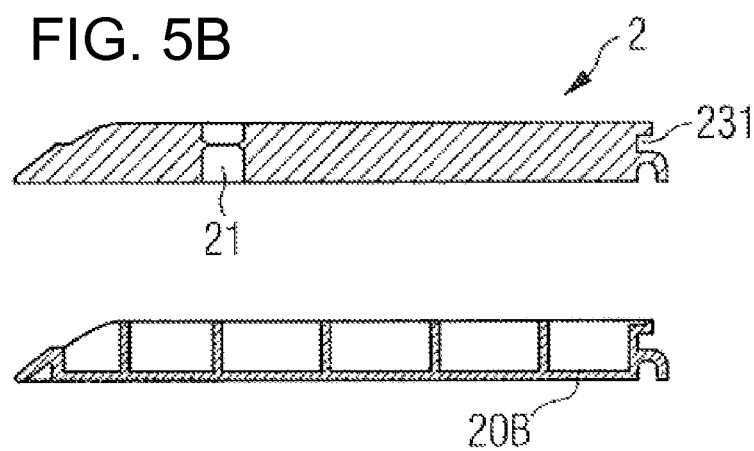
FIG. 5B shows a cross-sectional view of a base member for a spoiler according to a further embodiment.
Figure 5C:
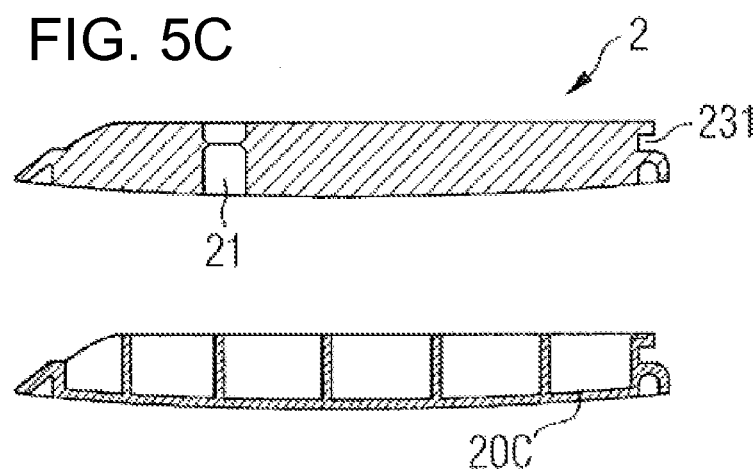
FIG. 5C shows a cross-secrtional view of a base member for a spoiler according to a further embodiment.

FIG. 5 shows cross-section views of base members 2 for various embodiments of a spoiler. Each embodiment is shown with two cross-sections through the grid structure of the base member 2. FIG. 5A of the diagram shows a base member 2 with a concave mounting face 20A, a through-hole 21, and a groove 231 for a tongue-and-groove connection to an aerodynamic member. FIG. 5B of the diagram shows a base member 2 with a flat mounting face 20B, a through-hole 21, and a groove 231 for a tongue-and-groove connection to an aerodynamic member. FIG. 5C of the diagram shows a base member 2 with a convex mounting face 20C, a through-hole 21, and a groove 231 for a tongue-and-groove connection to an aerodynamic member.

FIG. 6 shows cross-section views of various embodiments of a spoiler 1, showing a number of possible types of connection that could be made between the aerodynamic member 3 and the base member 2. Where appropriate, an enlarged view of a detail is shown. For simplicity, only one kind of undulating element 31A and reinforcing element 32A is shown, and it will be clear that any combination of various realizations of these elements could be used instead. The first four realizations A-D show particularly favorable embodiments, since in each of these embodiments, the aerodynamic member 3 is detachably connected to the base member 2 using simple snap-fit or tongue-and-groove connections, but without the need for any fasteners. In each of these realizations, the base member 2 can be mounted onto the rotor blade using any suitable approach, for example using an adhesive, screws, rivets, etc.

Figure 6A:
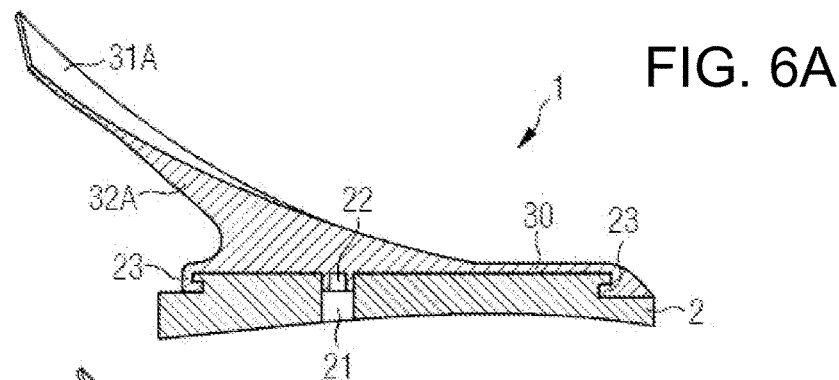
FIG. 6A shows a cross-sectional view according to an embodiment of a spoiler.
Figures 6B, 10A:
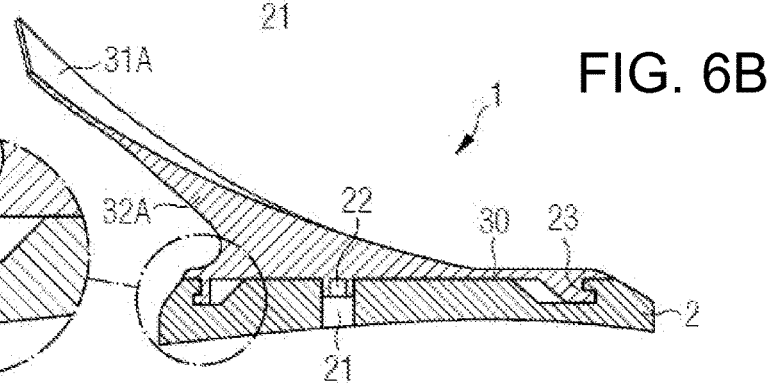
FIG. 6B shows a cross-sectional view of a spoiler according to a further embodiment.
FIG. 10A shows an enlarged cross-sectional view of a portion of the spoiler of FIG. 6B.
Figure 6C:
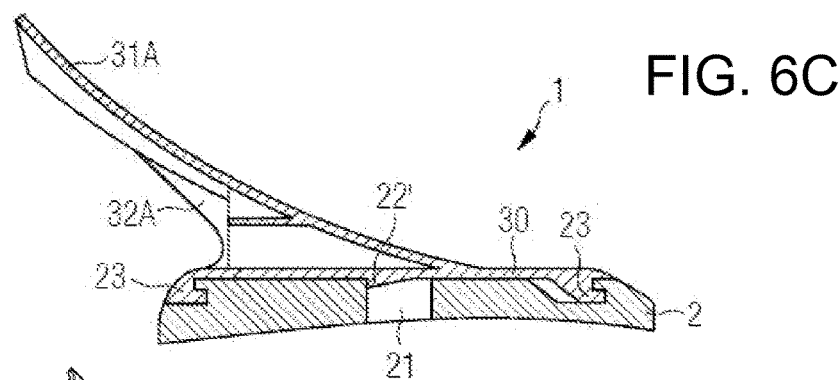
FIG. 6C shows a cross-sectional view of a spoiler according to a further embodiment.
Figures 6D, 10B:
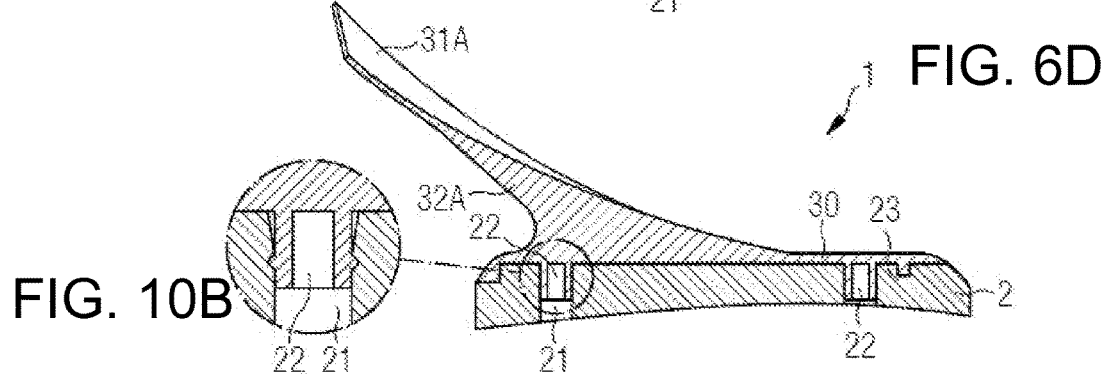
FIG. 6D shows a cross-sectional view of a spoiler according to a further embodiment.
FIG. 10B shows an enlarged cross-sectional view of a portion of the spoiler of FIG. 6D.

FIG. 6A of the diagram shows a connecting element 30 with a snap-fit connector 22 designed to mate with a through-hole 21 of the base member 2. The longitudinal edges of the aerodynamic member 3 and the base member 2 are formed to meet in a tongue-and-groove connection 23. This design could be appropriate for a relatively flexible aerodynamic member 3, for which the longitudinal edges can be folded back and over the edge of the base member with relatively little effort to make the tongue-and-groove connection 23. Of course, removing the aerodynamic member 3 can be just as easy. FIG. 6B of the diagram is similar to FIG. 6A, and shows different tongue-and-groove connections 23. The diagram also shows a detail of a tongue-and-groove connection 23. FIG. 6C of the diagram is similar to FIG. 6A and FIG. 6B, and shows a spoiler 1 with a different kind of snap-fit connector 22'. FIG. 6D of the diagram shows a connecting element 30 with two snap-fit connectors 22 designed to mate with corresponding through-holes 21 of the base member 2. This design also has a different tongue-and-groove connection 23 at one long side of the spoiler 1, and a simple profile overlap along the other long side underneath the undulating element 31A. The diagram also shows a detail of a snap-fit connector 22.

The remaining FIGS. 6E through FIG. 6G of the diagram show various realizations in which fasteners 6 are passed through the connecting element 30 of the aerodynamic member 3 and the base member 2. For improved aerodynamic properties, the fasteners 6 are inserted into appropriate recesses in the connecting element 30 of the aerodynamic member 3.

FIG. 6E shows one embodiment in which the base member 2 is mounted onto the rotor blade such that counter-nuts 60 are fixed in through-holes of the base member 2. These counter-nuts 60 can then receive suitable threaded bolts 6 inserted through openings in the connecting element 30 to connect the aerodynamic member 3 to the base member 2. To detach the aerodynamic member 3 from the base member 2, these bolts can be simply removed. FIG. 6F of the diagram shows an embodiment in which the base member 2 has a threaded bushing 61, which can receive a suitable threaded bolt 6 inserted through an opening in the connecting element 30 to connect the aerodynamic member 3 to the base member 2. This embodiment also includes a tongue-and-groove connection 23 at one long side of the spoiler 1. FIG. 6G of the diagram shows another embodiment with one tongue-and-groove connection 23 at one long side of the spoiler 1, and a counter-sunk fastener 6 inserted through openings in the connecting element 30 and the base member 2 into the body of the rotor blade 4.

FIGS. 7A-C shows a spoiler 1 according to an embodiment mounted onto the suction side 40 of a rotor blade 4 of a wind turbine. As can be seen in the diagram, the spoiler 1 comprises many base members 2 and many aerodynamic member 3 arranged along the edge of the rotor blade 4. The base members 2 can all be the same, while the aerodynamic members 3 can have different forms, depending on their position in the overall spoiler. Any of the realizations and connection means previously described could be used. Here, the aerodynamic members 3 further away from the blade root 44 are shaped to point 'upward', while the aerodynamic members 3 close to the blade root 44 are shaped to point 'downward', with a smooth transition over the length of the spoiler 1. The enlarged views show different realizations of the aerodynamic members 3. In FIG. 7B, the undulating element 31B of the aerodynamic member 3 is arranged as a planar foil with a wavy outer edge to extend beyond the edge of the base member 2. Reinforcing elements 32B act to support or hold the undulating element 31B. In FIG. 7C, an alternative type of aerodynamic member 3 is shown, wherein the undulating element 31A is arranged as a planar foil with a wavy outer edge at an angle to the connecting element 30, extending to the edge of the base member 2. Reinforcing elements 32A act to support or hold the undulating element 31A. Of course, these two types of aerodynamic member 3 could be combined as appropriate.

FIGS. 8A and 8B shows a spoiler 1 according to a further embodiment mounted onto the trailing edge 42 of a rotor blade 4 of a wind turbine. Here, the base members 2 are mounted on the trailing edge along a shoulder 45 of the rotor blade 4. FIG. 8B shows a possible choice of aerodynamic member 3, in this case using the undulating element 31B described above, arranged as a planar foil with a wavy outer edge to extend beyond the edge of the base member 2 and therefore also beyond the trailing edge. Again, reinforcing elements 32B act to support or hold the undulating element 31B. As the diagram shows, the base members 2 of the spoiler 1 can be as wide as the trailing edge 42.

Figure 9:
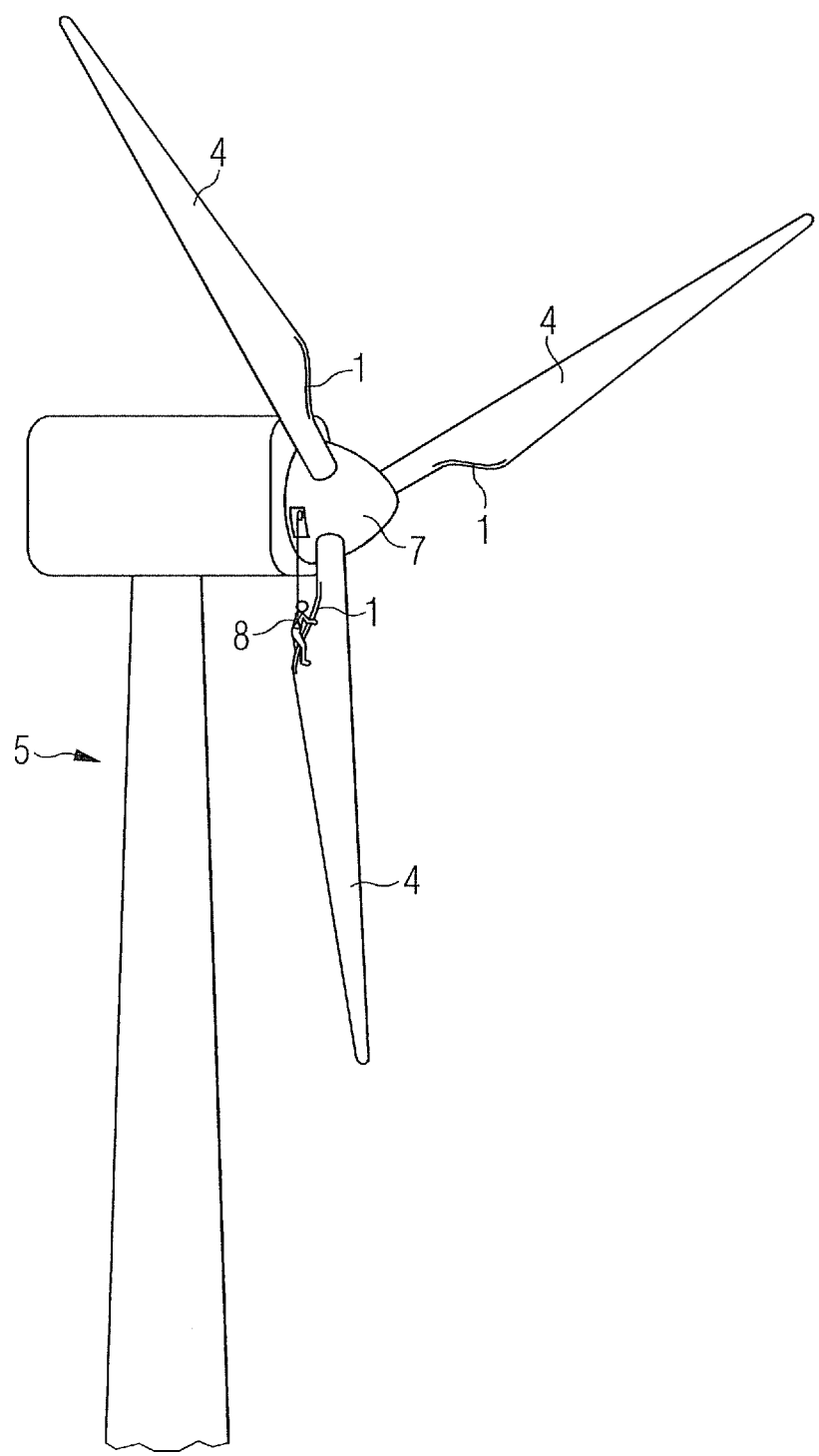
FIG. 9 shows a wind turbine.

FIG. 9 shows a wind turbine 5. Here, a maintenance step is being carried out. The generator has been deactivated, so that the hub does not turn, and so that one blade 4 is pointing downward. A service technician 8 has descended to the shoulder region of that blade 4, and can add, replace or remove one or more aerodynamic members 3 of the spoiler 1, so that the aerodynamic properties of the rotor blade 4 can be improved. The maintenance procedure can be very brief, particularly for a spoiler 1 in which the aerodynamic members 3 have been connected using snap-fit and tongue-and-groove connections, so that the down-time of the wind-turbine 5 can be favorably minimized.

For the sake of clarity, it is to be understood that the use of "a" or "an" throughout this application does not exclude a plurality, and "comprising" does not exclude other steps or elements.

The invention claimed is:

1. A spoiler for a rotor blade of a wind turbine, comprising:
   a base member having a mounting face for mounting onto a surface of the rotor blade; and
   an aerodynamic member for detachably connecting onto the base member, wherein the aerodynamic member includes a connecting element for connecting to the base member, and an undulating element arranged to protrude in a direction upwardly from the base member mounted onto the surface of the rotor blade when the aerodynamic member is connected to the base member.

2. The spoiler according to claim 1, wherein the mounting face is disposed toward a surface on the suction side and/or toward a surface on the trailing edge of the rotor blade.

3. The spoiler according to claim 2, wherein the mounting face of the base member comprises a concave surface and/or a flat surface and/or a convex surface.

4. The spoiler according to claim 1, wherein the base member comprises at least one through-hole for accommodating a fastener for mounting the base member onto the rotor blade.

5. The spoiler according to claim 1, comprising a snap-fit connector and/or a tongue-and-groove connector between the base member and the connecting element.

6. The spoiler according to claim 5, wherein the aerodynamic member comprises a reinforcing element arranged between the connecting element and the undulating element.

7. The spoiler according to claim 5, wherein the undulating element is rigid.

8. The spoiler according to claim 6, wherein the undulating element is rigid.

9. The spoiler according to claim 1, wherein the aerodynamic member comprises a closed body.

10. The spoiler according to claim 1, comprising a plurality of base members and/or a plurality of aerodynamic members.

11. A wind turbine, comprising:
a plurality of rotor blades attached to a hub, wherein at least one rotor blade comprises a spoiler mounted on a surface strip of the rotor blade, which surface strip comprises a length along a suction side of the rotor blade and/or a length along the trailing edge of the rotor blade,
wherein the spoiler comprises:
a base member, which base member comprises a mounting face for mounting onto a surface of a rotor blade, and
an aerodynamic member for detachably connecting onto the base member, the aerodynamic member having at least one undulating element arranged to protrude in a direction upwardly from the base member mounted onto the rotor blade when the aerodynamic member is connected to the base member.

12. The wind turbine according to claim 11, wherein the surface strip commences at a shoulder region of the rotor blade and extends in the direction of the blade tip.

13. The wind turbine according to claim 11, comprising an adhesive layer between the mounting face of the base member of the spoiler and the surface strip for an adhesive connection to the surface strip, and/or a number of fasteners inserted through the base member into the rotor blade for a threaded and/or riveted connection to the rotor blade.

14. A method of constructing a wind turbine, comprising the steps of:
manufacturing a rotor blade;
mounting a base member of a spoiler onto the rotor blade;
connecting the rotor blade to a hub of the wind turbine; and
connecting an aerodynamic member of the spoiler onto the base member, the aerodynamic member having at least one undulating element arranged to protrude in a direction upwardly from the base member mounted onto the rotor blade when the aerodynamic member is connected to the base member.

15. The method according to claim 14, wherein the base member of the spoiler comprises a mounting face for mounting onto a surface of the rotor blade, and wherein the aerodynamic member is provided for detachably connecting onto the base member.

16. The method according to claim 14, further comprising the step of:
disconnecting the aerodynamic member from the base member of the spoiler mounted on the rotor blade, which rotor blade is connected to the hub of the wind turbine; and
connecting a replacement aerodynamic member onto the base member.

17. The spoiler according to claim 1, wherein the undulating element comprises a wavy contour.

18. The wind turbine according to claim 11, wherein the at least one undulating element comprises a wavy contour.

19. The method according to claim 14, wherein the at least one undulating element comprises a wavy contour.

\* \* \* \* \*